H. P. PARROCK.
TOOL.
APPLICATION FILED JAN. 19, 1916.
1,179,753. Patented Apr. 18, 1916.
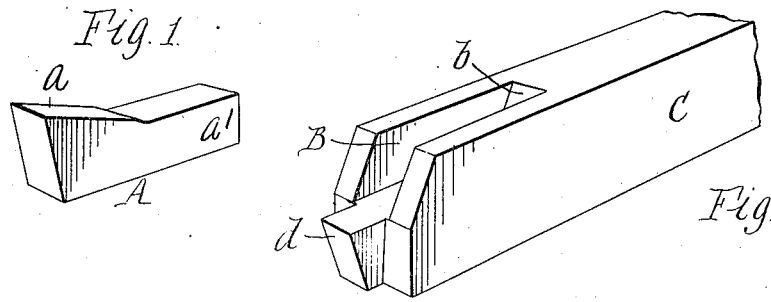
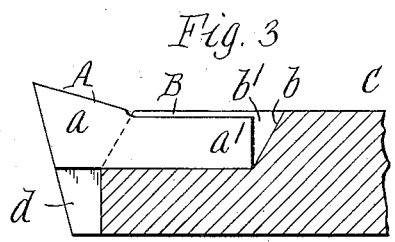
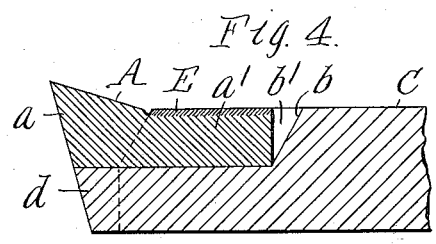
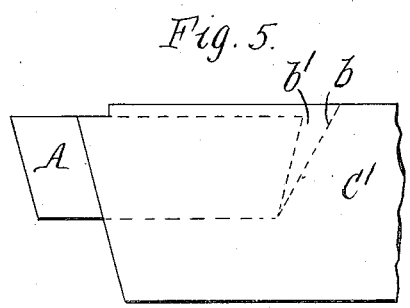
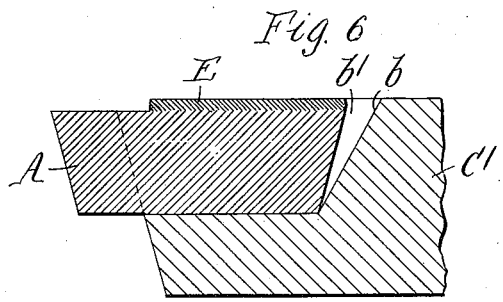
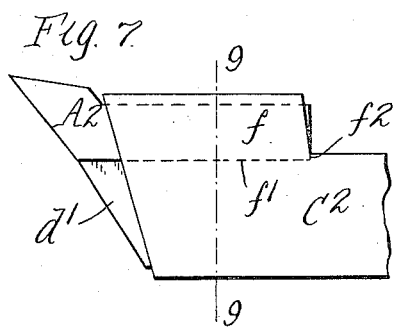
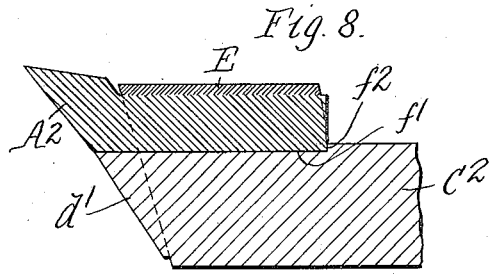
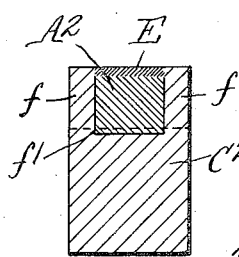
Witnesses.
C. H. Bund.
A. G. Dimond.
Inventor.
H. P. Parrock
by Wilhelm Parker Hood
Attorneys.

UNITED STATES PATENT OFFICE.

HARRY PERCIVAL PARROCK, OF BUFFALO, NEW YORK.

TOOL.

1,179,753. Specification of Letters Patent. Patented Apr. 18, 1916.

Application filed January 19, 1916. Serial No. 74,067.

*To all whom it may concern:*

Be it known that I, HARRY PERCIVAL PARROCK, a citizen of the United States, residing at Buffalo, in the county of Erie and State of New York, have invented a new and useful Improvement in Tools, of which the following is a specification.

This invention relates more particularly to cutting tools of the kind used in connection with metal-working machine tools.

The object of the invention is to produce a strong and practical tool composed of a shank or body portion of inexpensive material and a cutting point or bit of a superior quality of material which is secured in the shank or body in a novel manner, such that it cannot become loosened during the use of the tool, but may be removed from the shank or body when worn out and replaced by a new point. In this manner the wasting of a considerable amount of high grade material by the grinding or the sharpening of the tool is prevented, owing to the reduced cross-section of the cutting point of the tool.

In the accompanying drawings: Figure 1 is a perspective view of the cutting point or bit of a tool embodying the invention. Fig. 2 is a fragmentary perspective view of the shank or body portion of the tool. Fig. 3 is a fragmentary sectional elevation of the tool, showing the cutting point in position therein but not secured. Fig. 4 is a fragmentary longitudinal section thereof, showing the cutting point and shank welded together. Fig. 5 is a side elevation of a portion of a tool of slightly modified construction. Fig. 6 is a longitudinal vertical section thereof. Fig. 7 is a side elevation of a portion of a tool of another modified construction. Fig. 8 is a longitudinal vertical section thereof. Fig. 9 is a transverse section on line 9—9, Fig. 7.

Referring first to Figs. 1–4, A represents the cutting point or bit which may be made of any of the well known grades of cutting steel or alloys which are commonly used in metal working. The outer portion $a$ of the cutting point which is adapted to cut the work may be of any required shape, depending upon the use for which it is intended, while the rear portion $a'$ is preferably made rectangular in cross-section to fit into a longitudinal groove or depression B of similar cross-section, which is formed in the outer end of the shank or body portion C of the tool. The shank may be made in any suitable manner, for instance, by drop-forging, and is preferably made of some inexpensive grade of steel, and its size and length depend upon the type of machine and the holder in which the tool is to be used. The groove B is preferably slightly deeper than the height of the securing portion $a'$ of the cutting point, so that the side walls of the groove project above the top of the securing portion $a'$ of the point to facilitate the securing of the cutting point to the holder, but the side walls need not necessarily be higher than the securing portion of the cutting tool. The rear wall $b$ of the groove, in the construction shown in Figs. 2–6 inclusive, is inclined rearwardly so that when the cutting point is secured in the groove, a wedge-shaped cavity $b'$ will be formed between the inner end of the cutting point and the inclined end wall $b$ of the groove. A projection, such as shown at $d$ in Figs. 2–4 or at $d'$ in Figs. 7 and 8, may be formed on the shank extending beyond the end of the groove B, to act as a support for the projecting outer portion of the cutting point.

The groove B in the shank is preferably made of slightly less width than the cutting point and in assembling these two parts, the grooved end of the shank is first heated, after which the cold cutting point is forced into its position in the groove B. The hot side walls of the groove are then pressed or hammered tightly into contact with the sides of the cutting point to insure a tight fit between the cutting point and the side walls of the groove. The V-shaped cavity $b'$ which is formed between the inner end of the cutting point and the wall $b$ of the groove is filled with a suitable infusible clay or molding sand, and the upper face of the cutting point and the portions of the side walls of the groove extending above this face are then subjected to a welding heat and a puddle of molten metal is formed on the upper face of the securing portion $a'$ of the cutting point between the upwardly-projecting side walls of the groove B. The puddle of molten metal can be made by feeding an iron wire into the welding flame, or in any other suitable manner. This molten metal will form a welded connection between the upper face of the cutting point and upper portions of the side walls of the slot, while the sand or clay will prevent the metal from filling the cavity $b'$ at the inner end of the cutting point. The welded connection, together with the shrink fit brought about by the pressing of the hot metal of the shank into contact with the cold cutting point, will secure the cutting point very firmly and rigidly in the shank and will prevent any possible movement of the cutting point on the shank or the dislodgment thereof.

In order to remove the cutting point from the shank, the metal E welded to the upper face of the cutting point must first be removed in any suitable manner, for example, by remelting or by cutting out the metal in a suitable machine. The cutting point can then be removed by driving a suitable tool into the wedge-shaped cavity $b'$ and forcing the point out of the groove B. If necessary, the tool may be heated before driving out the old cutting point.

Figs. 5 and 6 show a tool in which the shank $C'$ is of somewhat different construction, the supporting projection for the cutting point being omitted and the tool being of a shape adapting it for different work. Figs. 7, 8 and 9 show a tool having a shank $C^2$ which is provided with upright walls $f$ $f$ on each side of the cutting point $A^2$, and also with a shallow groove or depression $f'$ forming a shoulder $f^2$ with which the inner end of the cutting point engages to prevent inward movement of the cutting point on the shank.

In the construction shown in Figs. 7, 8 and 9, the wedge-shaped cavity at the inner end of the cutting point is not needed, since access can be easily had to the inner end of the cutting point in tools of this construction for driving it out of the holding groove in the shank.

In the tool described the cutting point is so securely attached to the shank that it cannot become loosened while in use, whereas in tools in which the points are held by releasable means the holding means are very liable to become loose, which may break the tool or spoil the work. Nevertheless, the cutting point can be removed from the shank in a short time and with little labor and without injuring the shank. Furthermore, this tool need be no larger than a tool comprising a solid bar of steel, and there are no clamps or mechanical devices for holding the cutting point to the shank which are liable to interfere with the operator in using the tool. Since some kinds of high grade cutting steels are quite brittle and break easily, the tool described, in which the cutting point is supported on all sides by the tougher steel of the shank, will be stronger and less liable to break than a tool composed entirely of the high grade steel. Very little of the cutter will be ground off in sharpening the tool, owing to the small cross-section of the cutting point, and consequently not much of the expensive steel will be wasted, and the small remaining portions of the cutting points, after they are removed from the shank, can be remelted and formed again into the shapes desired.

I claim as my invention:

1. A tool comprising a shank having a groove, and a cutting point which is seated in said groove and extends out of one end thereof, and a welded connection between the outer side of said cutting point and the walls of said groove.

2. A tool comprising a shank having a groove, and a cutting point which is seated in said groove and extends out one end thereof, the side walls of said groove projecting beyond the outer side of said cutting point, and the space between the projecting portions of the groove walls being filled with metal which is welded to the outer surface of said cutting point and the projecting portions of the side walls of said groove.

3. A tool comprising a shank provided at one end with a groove having an inclined inner end wall, a cutting point which is seated in said groove and has a straight inner end face which forms with said inclined end wall of the groove a wedge-shaped cavity into which an implement may be driven for forcing the cutting point out of said groove.

4. A tool comprising a shank provided at one end with a groove having parallel side walls and an inclined inner end wall, a cutting point having parallel side faces seated in said groove and having a straight inner end face which forms with said inclined end wall of the groove a wedge-shaped cavity into which an implement may be driven for forcing the cutting point out of said groove, and a welded connection between the outer side of said cutting point and the outer portions of the side walls of said groove.

5. A tool comprising a shank having a groove at one end, and a cutting point which is seated in said groove, and a welded connection between the outer side of said cutting point and the outer portions of the side walls of said groove, the inner end of said cutting point being exposed whereby it is adapted to be engaged by an implement for forcing the cutting point out of said groove.

Witness my hand, this 17th day of January, 1916.

HARRY PERCIVAL PARROCK.

Witnesses:
 NATHANIEL B. PATCH,
 A. LOCKWOOD.